(12) United States Patent
Bank et al.

(10) Patent No.: US 10,171,486 B2
(45) Date of Patent: Jan. 1, 2019

(54) SECURITY AND AUTHENTICATION DAISY CHAIN ANALYSIS AND WARNING SYSTEM

(71) Applicant: International Business Machines Corporation, Armonk, NY (US)

(72) Inventors: Judith H. Bank, Cary, NC (US); Liam Harpur, Dublin (IE); Patrick J. O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 14/956,669

(22) Filed: Dec. 2, 2015

(65) Prior Publication Data

US 2017/0163676 A1 Jun. 8, 2017

(51) Int. Cl.
*H04L 29/06* (2006.01)
*G06F 17/30* (2006.01)

(52) U.S. Cl.
CPC .... *H04L 63/1433* (2013.01); *G06F 17/30554* (2013.01); *G06F 17/30867* (2013.01); *H04L 63/1425* (2013.01)

(58) Field of Classification Search
CPC ............. H04L 63/1433; H04L 63/1425; G06F 17/30554; G06F 17/30867
(Continued)

(56) References Cited

U.S. PATENT DOCUMENTS 8,402,518 B2   3/2013 Torres et al.
8,571,971 B1  10/2013 Brown et al.
(Continued)

FOREIGN PATENT DOCUMENTS

WO   2003049359 A1   6/2003
WO   2007021360 A2   2/2007
WO   2007050884 A2   5/2007

OTHER PUBLICATIONS

Internet Society RFCS et al., "A Simple Authentication and Security Layer (SASL) and Generic Security Service Application Program Interface (GSS-API) Mechanism for OpenID (RFC6616)," IP.com Prior Art Database Technical Disclosure, IP.com No. 000218247, May 2012, 37 pages.

(Continued)

*Primary Examiner* — Kambiz Zand
*Assistant Examiner* — Aubrey H Wyszynski
(74) *Attorney, Agent, or Firm* — Vanleeuwen & Vanleeuwen; Jefffrey S. LaBaw

(57) ABSTRACT

An approach is disclosed that provides a security and authentication daisy chain analysis and warning system to a user. The approach monitors sets of user authentication data pertaining network sites used by the user. Each of the sets of user authentication data is used by the user to access one of the sites. The approach gathers outputs displayed by many network sites, including those network sites accessed by the user. The first set of network sites is a subset of the second set of network sites. An analytical analysis is performed based on the sets of user authentication data and the gathered outputs. Based on the analytical analysis, the user can be alerted regarding security vulnerabilities. The vulnerabilities can correspond to one of the gathered outputs displayed at one network site matching at least a portion of one of the sets of the user's authentication data.

20 Claims, 8 Drawing Sheets

(58) Field of Classification Search
USPC .......................................................... 726/25
See application file for complete search history.

(56) References Cited

U.S. PATENT DOCUMENTS

| | | |
|---|---|---|
| 8,756,661 B2 | 6/2014 | Levenberg |
| 2003/0115105 A1 | 6/2003 | Lin et al. |
| 2008/0109657 A1 | 5/2008 | Bajaj et al. |
| 2008/0276319 A1* | 11/2008 | Rittermann ........... G06F 21/552 726/23 |
| 2012/0060220 A1 | 3/2012 | Kerseboom et al. |

OTHER PUBLICATIONS

Disclosed Anonymously, "Method and System for credential classification and reuse within IT systems," IP.com Prior Art Database Technical Disclosure, IP.com No. 000206811, May 2011, 5 pages.
Internet Society RFCS et al., Web Distributed Authoring and Versioning (WebDAV) Access Control Protocol (RFC3744), IP.com Prior Art Database Technical Disclosure, IP.com No. 000028249, May 2004, 74 pages.
"Newsroom: Identity Guard Launches New Identity Theft Protection Service," Identity Guard, Intersections Inc., Jan. 2014, 3 pages.

* cited by examiner

SECURITY AND AUTHENTICATION DAISY CHAIN ANALYSIS AND WARNING SYSTEM

BACKGROUND

Use of the Internet is widespread for everyday management of financial accounts, bill paying, shopping, communication, game playing, job search etc. Most of these activities could previously be conducted in person or over the phone. However, it is more cost effective for enterprises to conduct business over the Internet because fewer customer service employees are required. Therefore, customers are encouraged, or required to manage their affairs using Internet-based services. Customers, on the other hand, often have a vast number of passwords and user identifiers, security questions, and credentials. Since most customers cannot remember so much login data, many users take 'shortcuts' by having identical user names and passwords for multiple purposes. Many network-based sites employ an email address instead of a distinct user name to access the sites. This makes it even easier for hackers to gather bits and pieces of information which can later be used to steal a user's identity and/or take control of the user's online accounts.

SUMMARY

An approach is disclosed that provides a security and authentication daisy chain analysis and warning system to a user. The approach monitors sets of user authentication data pertaining network sites used by the user. Each of the sets of user authentication data is used by the user to access one of the sites. The approach gathers outputs displayed by many network sites, including those network sites accessed by the user. The first set of network sites is a subset of the second set of network sites. An analytical analysis is performed based on the sets of user authentication data and the gathered outputs. Based on the analytical analysis, the user can be alerted regarding security vulnerabilities. The vulnerabilities can correspond to one of the gathered outputs displayed at one network site matching at least a portion of one of the sets of the user's authentication data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
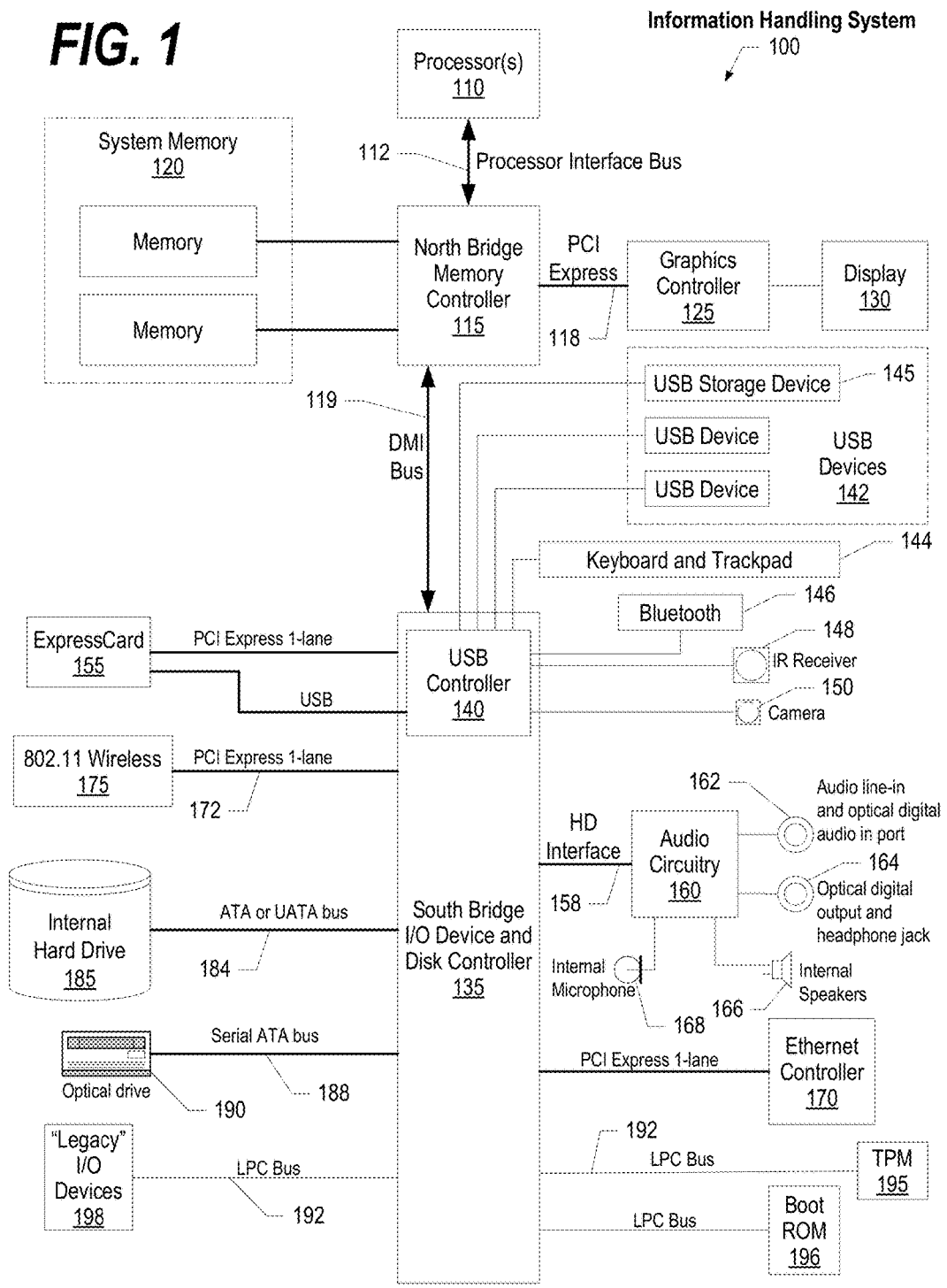
FIG. 1 is a block diagram of a data processing system in which the methods described herein can be implemented.

FIGS. 1-8 show an approach that alerts a user when personal data is used as input to one or more Web sites or Web applications if it could be combined and/or used to compromise the user identity on other Web sites. The user can optionally display a daisy chain of inputs and outputs and their relationship to various Web sites that collect or use them. For example, the last 4 digits of a social security number (SSN) or credit card (CC) number are widely available and can be used to change profiles and passwords on other Web sites. One web site might use the last 4 digits of a CC number to authenticate a password change and the last 4 digits of CC number are readily available on receipts or in emails. The approach provided herein uses analytics to determine how data entered in one Web site can be used to obtain or modify information on another Web site. For example, another web site might use a partial CC number for identification and authentication which is displayed by a different web site when the user logs on. Using the approach provided herein, the user can display a daisy chain report that illustrates how the output of one Web site can be used as proof of identification to another Web site. The system tracks Web page input and learns over time, from all monitored users, which Web sites ask for what types of information. The system maintains a database of data relationships between Web sites and other information sources in order to alert users regarding potential vulnerabilities pertaining to the user's authentication data.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
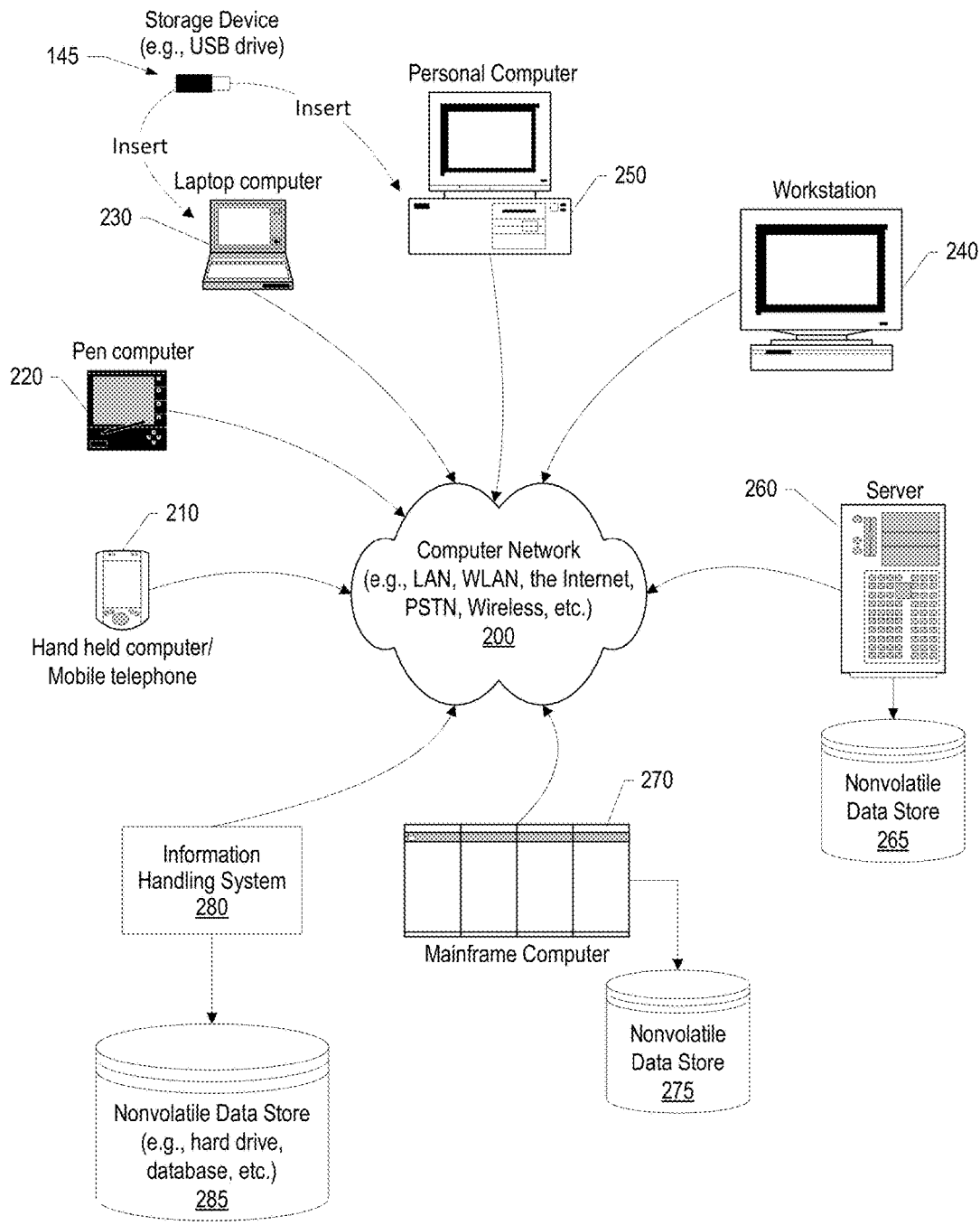
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
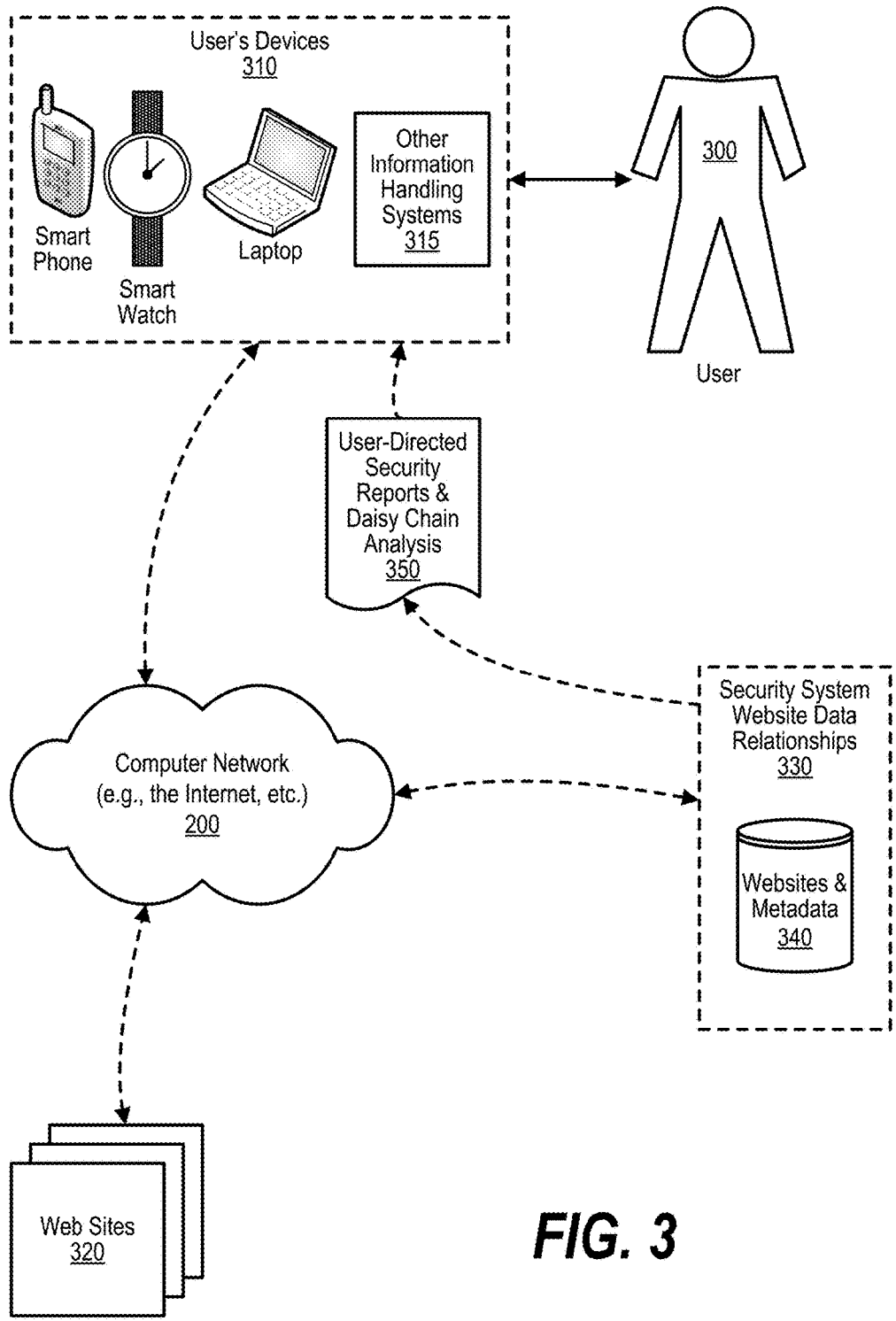
FIG. 3 is a component diagram depicting the various components used in providing a security and authentication daisy chain analysis and warning system.

FIG. 3 is a component diagram depicting the various components used in providing a security and authentication daisy chain analysis and warning system. User 300 utilizes a variety of devices 310 to access network 200, such as the Internet, to gain access to network sites 320, such as web sites. Devices 310 utilized by user 300 can include any device that allows the user to access a computer network, such as the Internet. These devices might include a smart phone, a smart watch, a laptop computer system, or other information handling system devices 315.

System 330 monitors sets of the user's authentication data pertaining to a first set of network sites that are used by the user. System 330 also gathers output data displayed by a second set of network sites. The second set of network sites includes the first set of network sites as well as additional network sites that are utilized by other users and not utilized by user 300. The authentication data includes metadata pertaining to the authentication data. For example, if an authentication data is an email address, the authentication data stored by the system in data store 340 includes both the email address (e.g., "johndoe@acme.com", etc.) as well as metadata pertaining to the authentication data (e.g., "email address," "credit card number," "last four digits of SSN," etc.). Likewise, output data gathered by system 330 includes both the actual output data (e.g., "janedoe@xyz.com" being displayed on a network site, etc.) as well as metadata pertaining to the output data (e.g., "email address," "user name," etc.).

System 330 performs an analytical analysis based on the sets of user authentication data and the sets of output data gathered by the system and stored in data store 340. The result of the analysis is data used to alert the user of possible security vulnerabilities. The security vulnerabilities include instances where output data displayed by a network site could compromise the security of authentication data provided by the user. For example, if one network site displays the last four digits of credit card numbers and another network site uses the last four digits as authentication data, such an instance would be flagged and the user alerted that the authentication data is vulnerable to capture and misuse by malevolent individuals, such as hackers. The analytical analysis performed by system 330 is used to generate security reports and daisy chain analysis representations 350 that are provided to user 300 for review and actions to minimize noted vulnerabilities.

Figure 4:
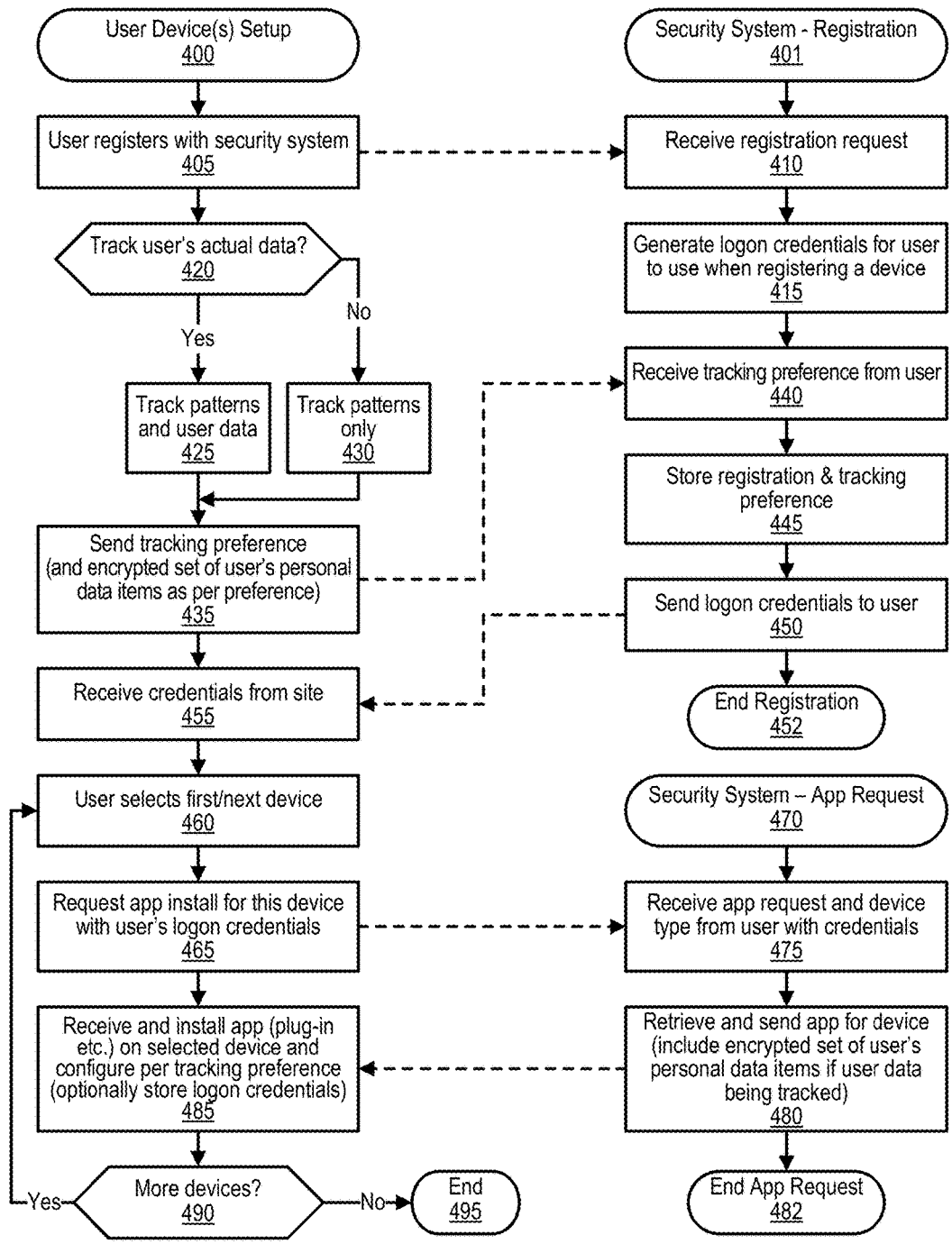
FIG. 4 is a flowchart depicting steps performed in setup of a user's device with a security system and registering the device at the security system.

FIG. 4 is a flowchart depicting steps performed in setup of a user's device with a security system and registering the device at the security system. User device setup depicted in FIG. 4 is shown commencing at 400. At step 405, the user device setup process registers the user with the security system by sending a registration request to the security system.

Security system registration processing depicted in FIG. 4 is shown commencing at 401. At step 410, the security system registration process receives the registration request from the user. At step 415, the security system registration process generates logon credentials for the user to use when registering the user's devices with the system.

Returning to user device setup processing, at decision 420 the process determines whether the user wishes to have the system track the user's actual authentication data or just track metadata and patterns associated with the authentication data. If the user wishes to have the system track the user's actual authentication data, then decision 420 branches to the 'yes' branch to perform step 425. On the other hand, if the user does not wish to have the system track the user's actual authentication data but just track the metadata and patterns associated with the user's authentication data, then decision 420 branches to the 'no' branch to perform step 430. At step 425, the process adds a tracking preference to track both the user's patterns and actual user authentication data. At step 430, the process adds a tracking preference to track the user's metadata and associated patterns only and not track the user's actual authentication data. At step 435, the user device setup process sends the user's tracking preference to the security system. The transmission includes an encrypted set of the user's personal authentication data items if the user chose to track the user's actual authentication data.

Returning to the security system registration process, at step 440, the security system process receives the tracking preference from user. At step 445, the security system registration process stores the user's registration and the user's tracking preference in a data store accessible to the security system. At step 450, the security system registration process sends the generated logon credentials to the user. The security system registration process thereafter ends at 452.

Returning to user device setup processing, at step 455, the user process receives the generated logon credentials from the security system. At step 460, the user of the user security process users selects the first device that the user utilizes to access network sites (e.g., the user's smart phone, laptop computer, etc.). At step 465, the user requests an application, or "app," to install on the selected device with the user's logon credentials.

Security system app request processing depicted in FIG. 4 is shown commencing at 470. At step 475, the security system app request process receives the app request and device type from user along with the user's credentials. At step 480, the security system app request process retrieves and sends the app for the user's device that is being set up. The data sent by the security system app request process also includes an encrypted set of the user's personal authentication data items if the user chose to track the user's authentication data. The security system app request process thereafter ends at 482.

Returning to user device setup processing, at step 485, the user device setup process receives the app from the security system (e.g., plug-in, etc.) and installs the received app on the user's selected device. The device is further configured based on the user's tracking preference. The user next determines whether more devices are being set up (decision 490). If more devices are being set up, then decision 490 branches to the 'yes' branch which loops back to step 460 to select the next device and request the app and data from the security system. This looping continues until the user does not wish to set up the app on any more devices, at which point decision 490 branches to the 'no' branch exiting the loop. User device setup processing thereafter ends at 495.

Figure 5:
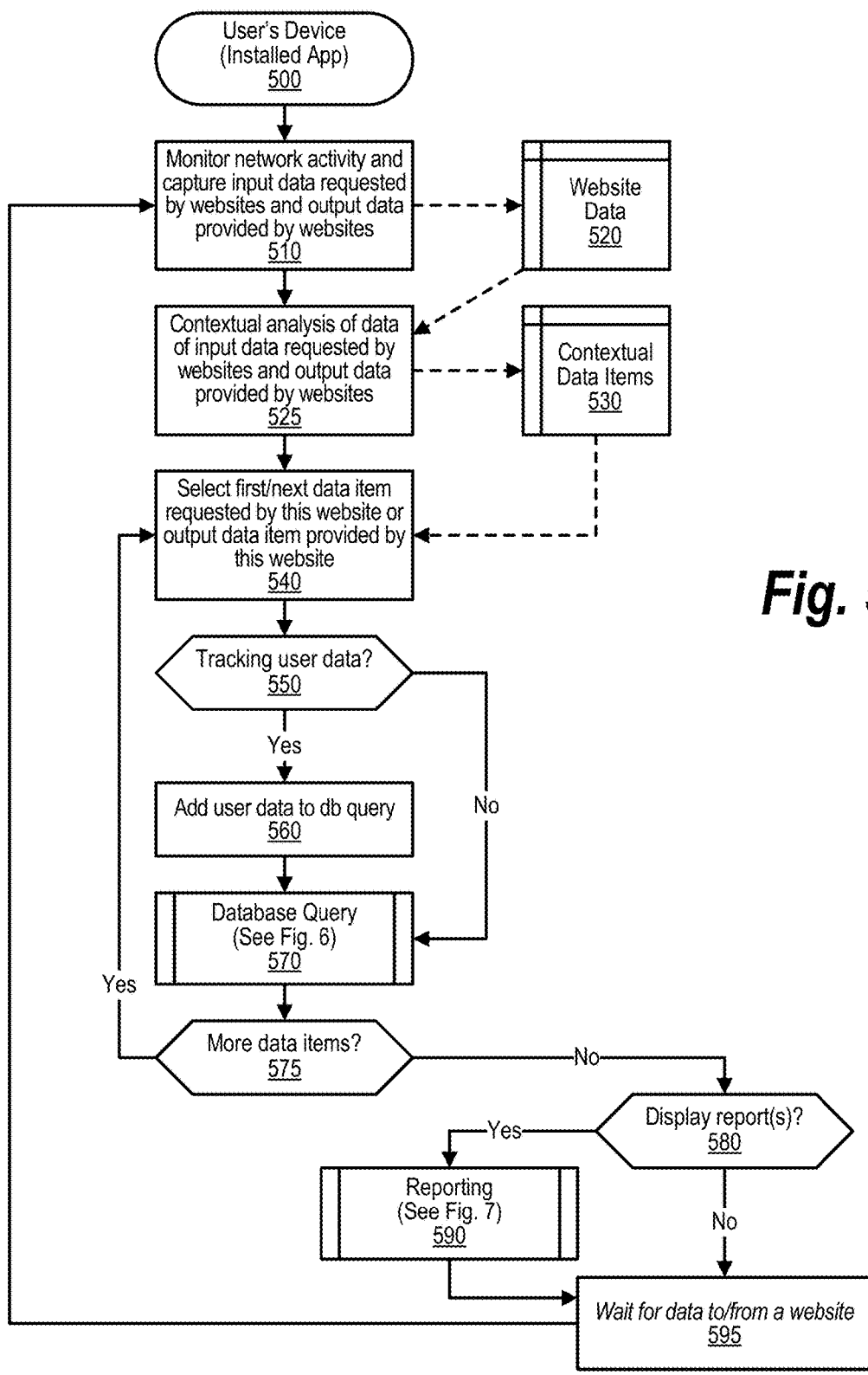
FIG. 5 is a flowchart depicting steps taken at a user device to provide a security and authentication daisy chain analysis and warning system.

FIG. 5 is a flowchart depicting steps taken at a user device to provide a security and authentication daisy chain analysis and warning system. FIG. 5 processing commences at 500 and shows the steps taken by a process that runs on the user's device due to the app that was previously installed on the user's device in FIG. 4. At step 510, the process monitors the network activity at the user's device and captures input data requested by network sites as well as output data displayed on network sites. The input and output data captured at step 510 is stored in memory area 520. At step 525, the process performs a contextual analysis of the input data requested by network sites and the output data displayed by network sites. The contextual analysis identifies the type of data that is being input and output. For example, if a network site displays four digits on a page and those four digits correspond to the last four digits of the user's social security number, then the contextual analysis would resolve the four digits to be "last four digits SSN," etc. The contextual data resulting from the analysis performed at step 525 is stored in memory area 530.

Figure 6:
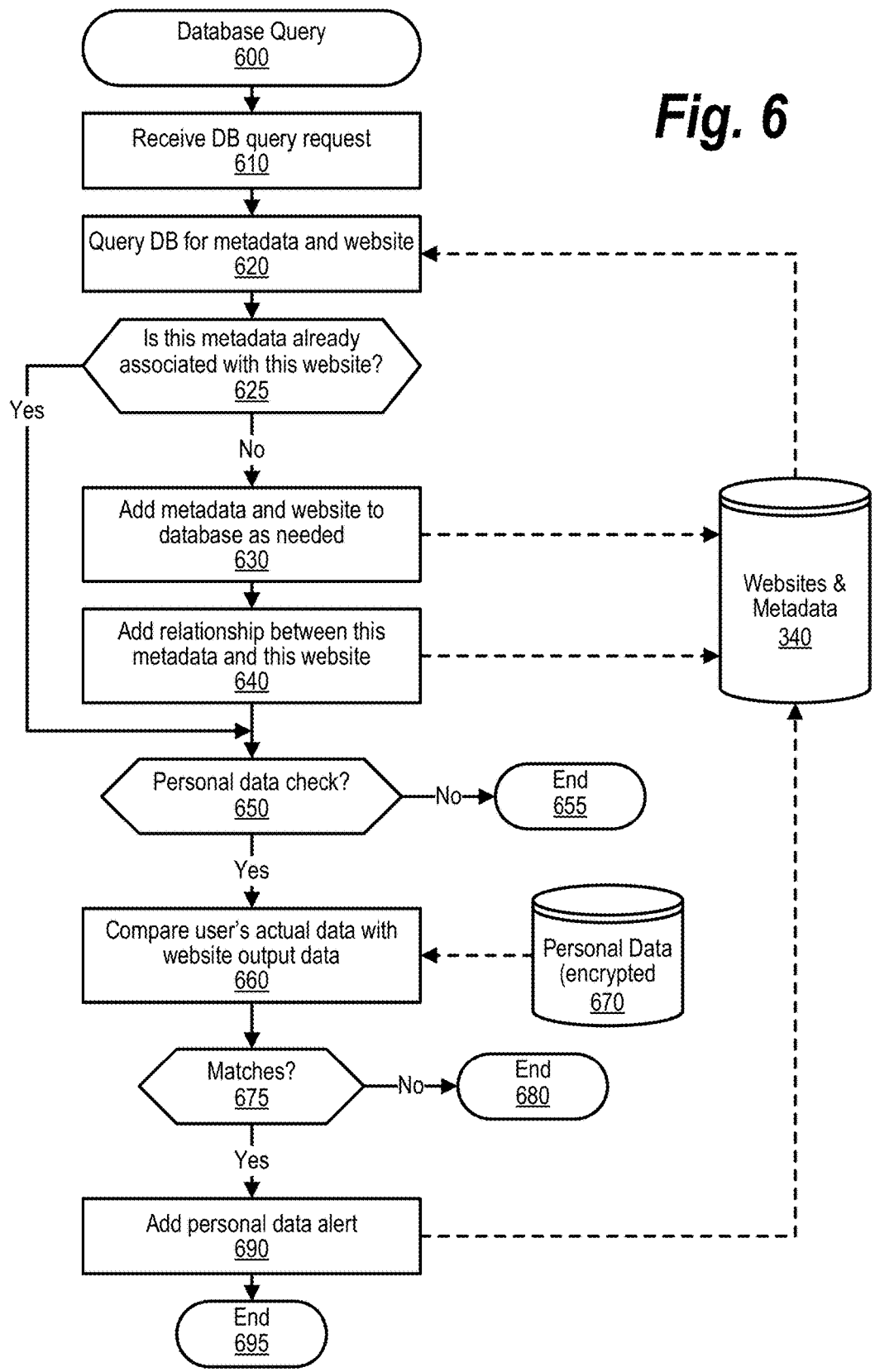
FIG. 6 is a flowchart depicting steps performed handling a database request received from a user device.

At step 540, the process selects the first conceptual data item captured and analyzed by the process from memory area 530. The process determines as to whether the user has indicated a preference to track the user's personal authentication data or simply the contextual data (decision 550). If the user has indicated a preference to track the user's personal authentication data, then decision 550 branches to the 'yes' branch to perform step 560. On the other hand, if the user has not indicated a preference to track the user's personal authentication data, then decision 550 branches to the 'no' branch bypassing step 560. At step 560, the process adds the user's personal authentication data to the database query that is being created. At predefined process 570, the process performs the database query routine (see FIG. 6 and corresponding text for processing details). As shown in FIG. 6, the database query routine adds the data captured by the process to a database maintained by the security service's network site. The process determines as to whether there are more data items stored in memory area 530 that need to be processed (decision 575). If there are more data items stored in memory area 530 that need to be processed, then decision 575 branches to the 'yes' branch which loops back to step 540 to select and process the next data item as described above. This looping continues until there are no more data items that need to be processed, at which point decision 575 branches to the 'no' branch exiting the loop.

The process determines as to whether the user has requested to display reports data pertaining to the user's security regarding the various network sites (decision 580). If the user has requested to display reports, then decision 580 branches to the 'yes' branch to perform predefined process 590. On the other hand, if not display report(s), then decision 580 branches to the 'no' branch bypassing predefined process 590. At predefined process 590, the process performs the reporting routine (see FIG. 7 and corresponding text for processing details). At step 595, the process waits for data to/from a network site. When new data is detected, the process loops back to step 510 to process the data as described above.

FIG. 6 is a flowchart depicting steps performed handling a database request received from a user device. FIG. 6 processing commences at 600 and shows the steps taken by a process that performs the database query function. in one embodiment, this routine is performed at a security service provider's network site when it receives database query data from a user of the security service. At step 610, the process receives a database query request from a user of the security service. At step 620, the process queries database 340 for the data, metadata, and network site information that were included in the request received from the user.

The process determines as to whether the data and metadata is already associated with the network site (decision 625). For example, a network site that the user frequently visits. If the data and metadata is already associated with the network site, then decision 625 branches to the 'yes' branch bypassing steps 630 and 640. On the other hand, if the data and metadata is not already associated with the network site, then decision 625 branches to the 'no' branch to perform steps 630 and 640. At step 630, the process adds the data, metadata, and network site to the database as needed based on the query results. At step 640, the process adds a relationship between this metadata and this network site.

The process determines as to whether the user has indicated a preference to track the user's personal authentication data (decision 650). If the user has indicated a preference to track the user's personal authentication data, then decision 650 branches to the 'yes' branch to perform steps 660 through 695. On the other hand, if the user has not indicated a preference to track the user's personal authentication data, then decision 650 branches to the 'no' branch whereupon processing ends at 655.

At step 660, the process compares the user's actual authentication data with the data displayed on the network site. The data displayed on the network site is retrieved from the database request that was received from the user. The security service retrieves the user's personal authentication data from data store 670, with authentication data being stored in an encrypted format. The process determines as to whether the comparision reveals a match between user's actual authentication data with the data displayed on the network site (decision 675). If a match is found, then decision 675 branches to the 'yes' branch to perform step 690. On the other hand, if a match is not found, then decision 675 branches to the 'no' branch and processing ends at 680. At step 690, the process adds a personal data alert to the user's reporting data that is stored in database 340. In one embodiment, the process sends an alert to the user's device alerting the user of the potential vulnerability of the user's personal authentication data. Processing thereafter ends at 695.

Figure 7:
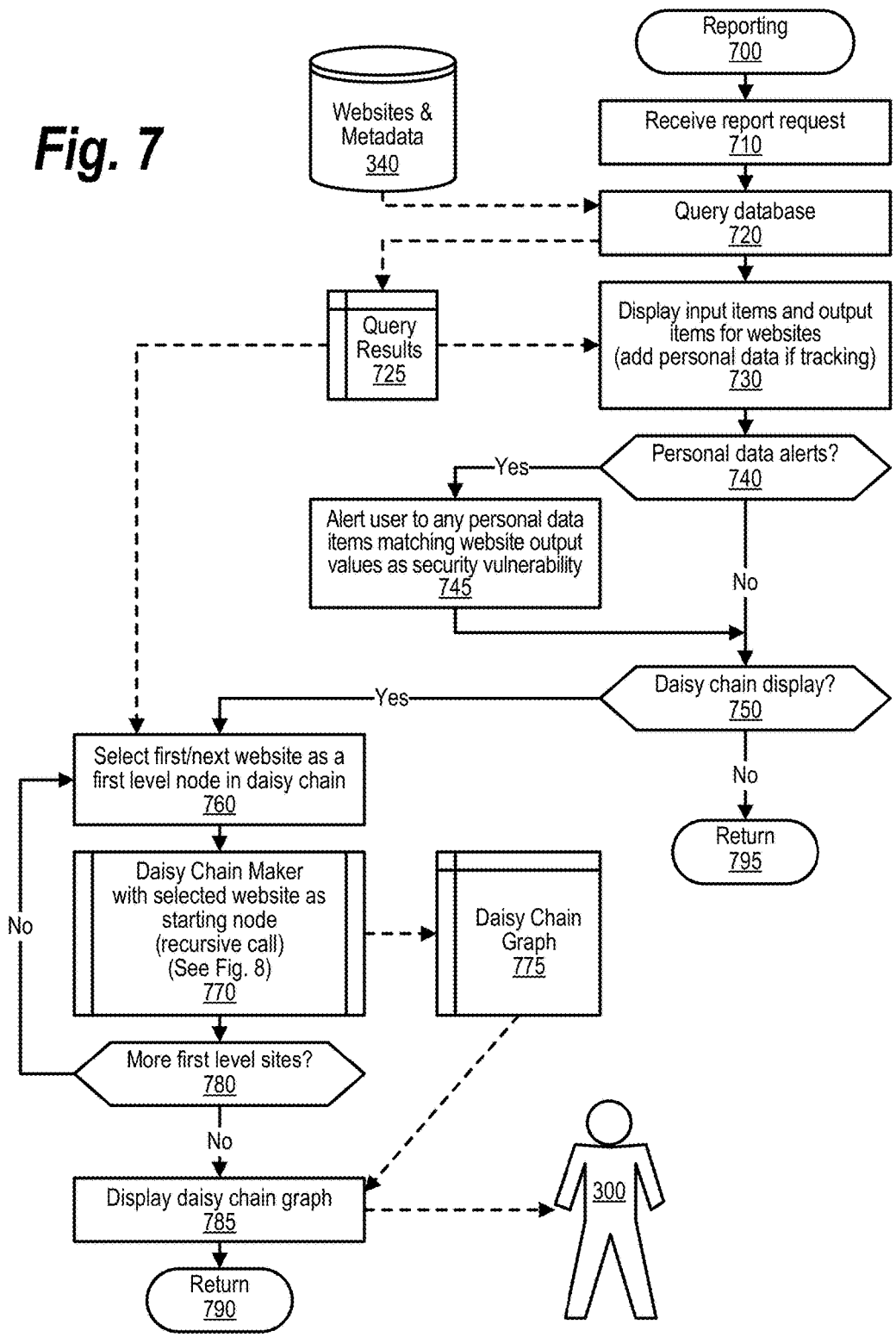
FIG. 7 is a flowchart depicting steps performed in reporting a security and authentication daisy chain analysis to a user and warning the user regarding security vulnerabilities.

FIG. 7 is a flowchart depicting steps performed in reporting a security and authentication daisy chain analysis to a user and warning the user regarding security vulnerabilities. FIG. 7 processing commences at 700 and shows the steps taken by a process that performs a reporting function. At step 710, the process receives a report request from a user of the security service. At step 720, the process queries database 340 for security data maintained on the user's behalf by the security service. The database query results are stored in memory area 725 and include contextual data items provided by the user to various network sites as well as network sites that display, or otherwise provide, such data items. Data items that are input on one network site and provided on another network site indicate a possible vulnerability of the user's authentication data.

At step 730, the process displays input items and output items for various network sites. Note that the output items displayed by network sites do not necessarily have to be network sites that the user accesses, but might be network sites that were accessed by other user's of the security service. For example, the user might input authentication data of the last four digits of the user's social security number to a network site named "acme.com". However, another network site, "xyz.com" displays the last four digits of users' social security numbers on its page. Thus, a link can be established between these two network sites even though this particular user is only utilizing one of the sites. In addition, if the user has indicated a preference to track the user's personal authentication data in addition to the contextual data items, the matching performed at step 730 would also match such personal authentication data to data output by the various network sites.

The process determines as to whether the user has indicated a preference to receive personal data alerts (decision 740). If the user has indicated a preference to receive personal data alerts, then decision 740 branches to the 'yes' branch to perform step 745. On the other hand, if the user has not indicated a preference to receive personal data alerts, then decision 740 branches to the 'no' branch bypassing step 745. At step 745, the process alerts the user to any personal data items matching network sites output data as a potential security vulnerability. in one embodiment, the security alerts were detected and added to the database by the database process shown in FIG. 6. The process determines as to whether the user has indicated a preference to view a daisy chain display as part of the reporting (decision 750). If the user has indicated a preference to view a daisy chain display as part of the reporting, then decision 750 branches to the 'yes' branch to perform steps 760 through 790. On the other hand, if the user has not indicated a preference to view a daisy chain display as part of the reporting, then decision 750 branches to the 'no' branch bypassing steps 760 through 790 and processing ends at 795.

Steps 760 through 790 are performed to display daisy chain report data. At step 760, the process selects the first network site as a first level node in the daisy chain. At predefined process 770, the process performs the Daisy Chain Maker routine using the selected network site as one of the starting nodes in the graph (see FIG. 8 and corresponding text for processing details). The Daisy Chain Maker routine is a recursively called routine that is called by both FIG. 7 for first level nodes of the daisy chain and also called within FIG. 8 for nodes that are not first level nodes in the graph. The daisy chain maker routine stores the Daisy Chain representation in memory area 775. After predefined process processes the first level node, processing returns to FIG. 7 and the process then determines whether there are more first level nodes to include in the daisy chain representation (decision 780). If there are more first level nodes to include in the daisy chain representation, then decision 780 branches to the 'yes' branch which loops back to step 760 to select the next network site from memory area 725 as a first level node in the daisy chain and perform predefined process 770 for this network site. This looping continues until network sites have been selected as first level nodes, at which point decision 780 branches to the 'no' branch exiting the loop. At step 785, the process displays daisy chain graph representation 775 to user 300. FIG. 7 processing thereafter returns to the calling routine (see FIG. 6) at 790.

Figure 8:
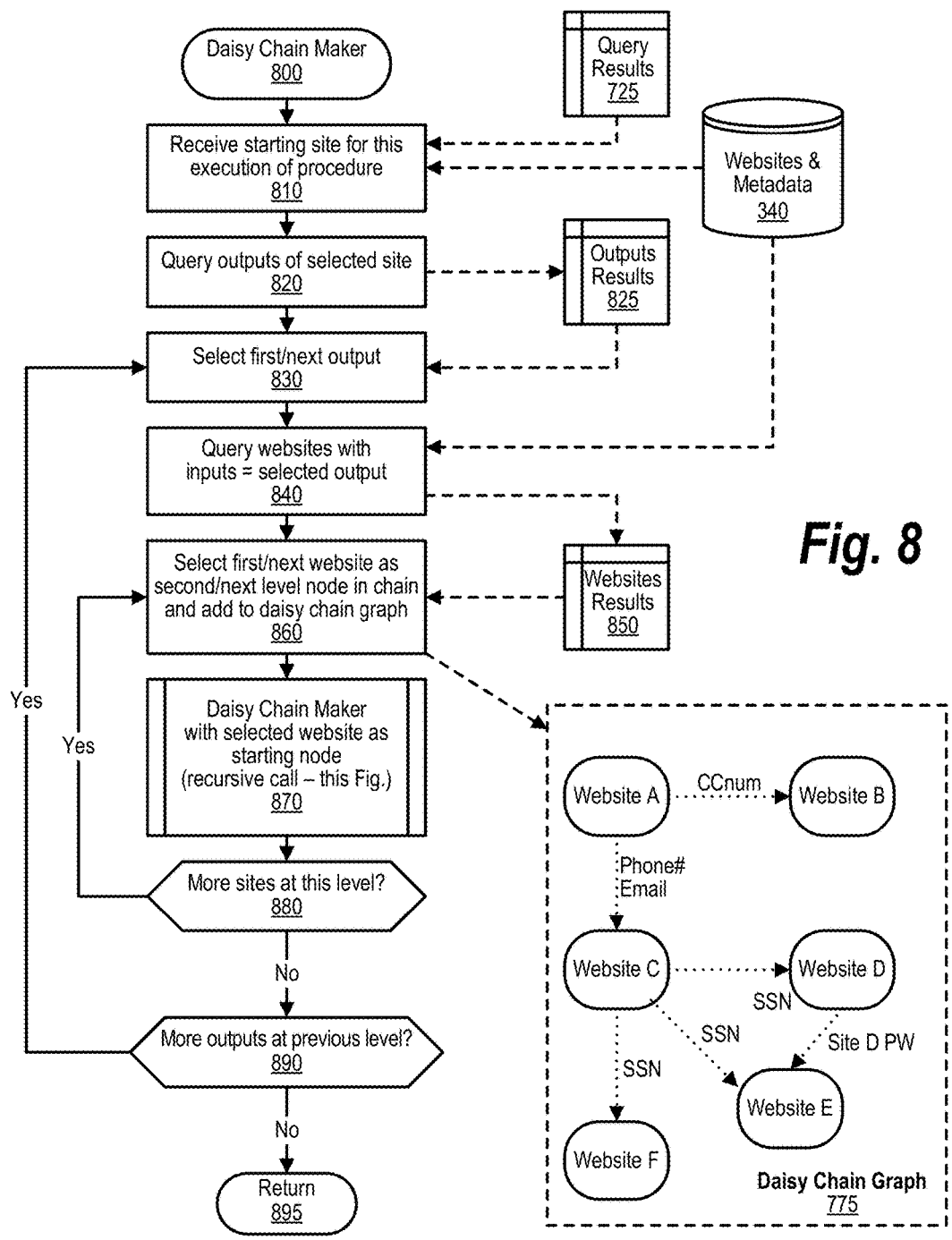
FIG. 8 is a flowchart depicting steps performed in preparing a daisy chain security report.

FIG. 8 is a flowchart depicting steps performed in preparing a daisy chain security report. FIG. 8 processing commences at 800 and shows the steps taken by the daisy chain maker process. At step 810, the process receives starting network site for this execution of the procedure. The network site is included in the call that was made to invoke this routine and the network site data is retrieved from memory area 725. At step 820, the process performs a database query of outputs of the selected network site. The results are stored in memory area 825. At step 830, the process selects the first output result from memory area 825. At step 840, the process queries network sites that use inputs that are the same as the selected output, thus matching outputs displayed on network sites with inputs received at other network sites.

At step 860, the process selects the first network site as the second or next level node in the daisy chain and the process adds the selected network site to the daisy chain graph that is stored in memory area 775. As depicted in the example daisy chain data shown in memory area 775, contextual data displayed on network sites are displayed in a daisy chain format being connected to network sites that use such contextual data as authentication inputs. At predefined process 870, the process performs a recursive call to this routine with the call including the current network site selected at step 860 as the starting node for the next execution of the daisy chain maker routine. The process determines as to whether there are any more network sites at this level to be processed (decision 880). If there are more network sites at this level to be processed, then decision 880 branches to the 'yes' branch which loops back to step 860 to select the next network site at this level to be processed with the daisy chain maker routine. This looping continues until there are no further network sites to process at this level, at which point decision 880 branches to the 'no' branch exiting the loop.

Once all the network sites from the current node level have been processed, the process determines as to whether there are more outputs from the previous level to process (decision 890). If there are more outputs from the previous level to process, then decision 890 branches to the 'yes' branch which loops back to step 830 to select the next output from memory area 825. This looping continues until there are no more outputs to process, at which point decision 890 branches to the 'no' branch exiting the loop. FIG. 8 processing thereafter returns to the calling routine at 895. Because this routine is a recursively called routine, processing may return to a previous instance of this routine that made the recursive call. Once all recursive calls have been exhausted, processing returns to the original calling routine (see FIG. 7).

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system that includes one or more processors and a memory accessible by at least one of the processors, the method comprising:
    monitoring a plurality of sets of user authentication data pertaining to a first plurality of network sites, wherein each of the sets of user authentication data is used by a user to access one of the first plurality of network sites;
    storing a first set of metadata pertaining to the plurality of sets of user authentication data in a database;
    gathering a plurality of outputs displayed by a second plurality of network sites, wherein the first plurality of network sites is a subset of the second plurality of network sites;
    storing a second set of metadata pertaining to the plurality of outputs in the database;
    performing an analytical analysis based on the sets of user authentication data and the gathered outputs; and
    alerting the user regarding one or more security vulnerabilities, wherein at least one of the vulnerabilities corresponds to a selected one of the plurality of outputs matching at least a portion of a selected set from the user authentication data, and wherein the alerting further comprises providing a visual representation that depicts one or more links between the first set of metadata and the second set of metadata.

2. The method of claim 1 further comprising:
    generating the first set of metadata and the second set of metadata based on a flow of information corresponding to each of the network sites included in the first and second plurality of network sites; and
    performing the analytical analysis on the generated plurality of metadata.

3. The method of claim 2 further comprising:
    providing the user with a summary report of the first set of metadata, the second set of metadata, and the flow of information pertaining to the user's authentication data.

4. The method of claim 1 further comprising:
    providing a report to the user that explains how data entered at a first network site selected from the first plurality of network sites can be displayed at a second network site selected from the second plurality of network sites.

5. The method of claim 1 further comprising:
identifying one or more security exposures based on a sequence of elements included in the first and second sets of metadata stored in the database.

6. The method of claim 1 wherein the user input authentication data is selected from a group consisting of one or more email addresses, one or more user names, one or more passwords, one or more birth dates, one or more addresses, one or more telephone numbers, one or more Web site security questions and answers, at least a portion of a social security number, at least a portion of a pin number, at least a portion of a medical insurance identification number, at least a portion of a credit card number, at least a portion of a family member name, at least a portion of a driver license number, at least a portion of a registration identification, at least a portion of a hidden number, and at least a portion of an identification number.

7. The method of claim 1 wherein the visual representation is a daisy chain representation that links the first set of metadata to the second set of metadata.

8. An information handling system comprising:
one or more processors;
a memory coupled to at least one of the processors; and
a set of instructions stored in the memory and executed by at least one of the processors, wherein the set of instructions perform actions comprising:
monitoring a plurality of sets of user authentication data pertaining to a first plurality of network sites, wherein each of the sets of user authentication data is used by a user to access one of the first plurality of network sites;
storing a first set of metadata pertaining to the plurality of sets of user authentication data in a database;
gathering a plurality of outputs displayed by a second plurality of network sites, wherein the first plurality of network sites is a subset of the second plurality of network sites;
storing a second set of metadata pertaining to the plurality of outputs in the database;
performing an analytical analysis based on the sets of user authentication data and the gathered outputs; and
alerting the user regarding one or more security vulnerabilities, wherein at least one of the vulnerabilities corresponds to a selected one of the plurality of outputs matching at least a portion of a selected set from the user authentication data, and wherein the alerting further comprises providing a visual representation that depicts one or more links between the first set of metadata and the second set of metadata.

9. The information handling system of claim 8 wherein the actions further comprise:
generating the first set of metadata and the second set of metadata based on a flow of information corresponding to each of the network sites included in the first and second plurality of network sites; and
performing the analytical analysis on the generated plurality of metadata.

10. The information handling system of claim 9 wherein the actions further comprise:
providing the user with a summary report of the first set of metadata, the second set of metadata, and the flow of information pertaining to the user's authentication data.

11. The information handling system of claim 8 wherein the actions further comprise:
providing a report to the user that explains how data entered at a first network site selected from the first plurality of network sites can be displayed at a second network site selected from the second plurality of network sites.

12. The information handling system of claim 8 wherein the actions further comprise:
identifying one or more security exposures based on a sequence of elements included in the first and second sets of metadata stored in the database.

13. The information handling system of claim 8 wherein the user input authentication data is selected from a group consisting of one or more email addresses, one or more user names, one or more passwords, one or more birth dates, one or more addresses, one or more telephone numbers, one or more Web site security questions and answers, at least a portion of a social security number, at least a portion of a pin number, at least a portion of a medical insurance identification number, at least a portion of a credit card number, at least a portion of a family member name, at least a portion of a driver license number, at least a portion of a registration identification, at least a portion of a hidden number, and at least a portion of an identification number.

14. The information handling system of claim 8 wherein the visual representation is a daisy chain representation that links the first set of metadata to the second set of metadata.

15. A computer program product stored in a computer readable storage medium, comprising computer instructions that, when executed by an information handling system, causes the information handling system to perform actions comprising:
monitoring a plurality of sets of user authentication data pertaining to a first plurality of network sites, wherein each of the sets of user authentication data is used by a user to access one of the first plurality of network sites;
storing a first set of metadata pertaining to the plurality of sets of user authentication data in a database;
gathering a plurality of outputs displayed by a second plurality of network sites, wherein the first plurality of network sites is a subset of the second plurality of network sites;
storing a second set of metadata pertaining to the plurality of outputs in the database;
performing an analytical analysis based on the sets of user authentication data and the gathered outputs; and
alerting the user regarding one or more security vulnerabilities, wherein at least one of the vulnerabilities corresponds to a selected one of the plurality of outputs matching at least a portion of a selected set from the user authentication data, and wherein the alerting further comprises providing a visual representation that depicts one or more links between the first set of metadata and the second set of metadata.

16. The computer program product of claim 15 wherein the actions further comprise:
generating the first set of metadata and the second set of metadata based on a flow of information corresponding to each of the network sites included in the first and second plurality of network sites; and
performing the analytical analysis on the generated plurality of metadata.

17. The computer program product of claim 16 wherein the actions further comprise:

providing the user with a summary report of the first set of metadata, the second set of metadata, and the flow of information pertaining to the user's authentication data.

18. The computer program product of claim 15 wherein the actions further comprise:
providing a report to the user that explains how data entered at a first network site selected from the first plurality of network sites can be displayed at a second network site selected from the second plurality of network sites.

19. The computer program product of claim 15 wherein the actions further comprise:
identifying one or more security exposures based on a sequence of elements included in the first and second sets of metadata stored in the database.

20. The computer program product of claim 15 wherein the visual representation is a daisy chain representation that links the first set of metadata to the second set of metadata.

\* \* \* \* \*